(12) United States Patent
Priyantha et al.

(10) Patent No.: US 10,359,846 B2
(45) Date of Patent: Jul. 23, 2019

(54) WEARABLE DEVICE GESTURE DETECTION

(71) Applicant: Microsoft Technology Licensing, LLC, Redmond, WA (US)

(72) Inventors: Nissanka Arachchige Bodhi Priyantha, Redmond, WA (US); Jie Liu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/005,056

(22) Filed: Jun. 11, 2018

(65) Prior Publication Data

US 2018/0292901 A1   Oct. 11, 2018

Related U.S. Application Data

(63) Continuation of application No. 15/223,887, filed on Jul. 29, 2016, now Pat. No. 10,191,543, which is a continuation of application No. 14/286,910, filed on May 23, 2014, now Pat. No. 9,594,427.

(51) Int. Cl.
*G06F 3/01* (2006.01)
*G06F 3/041* (2006.01)
*G06F 1/16* (2006.01)

(52) U.S. Cl.
CPC .............. *G06F 3/014* (2013.01); *G06F 1/163* (2013.01); *G06F 1/1698* (2013.01); *G06F 3/017* (2013.01); *G06F 3/041* (2013.01); *G06F 2203/0331* (2013.01)

(58) Field of Classification Search
CPC ........ G06F 3/014; G06F 1/1698; G06F 1/163; G06F 3/017; G06F 3/041; G06F 2203/0331
See application file for complete search history.

(56) References Cited

U.S. PATENT DOCUMENTS

2011/0080339 A1* 4/2011 Sun ......................... G06F 3/017
345/157
2014/0028539 A1* 1/2014 Newham ............... G06F 1/1694
345/156

* cited by examiner

*Primary Examiner* — Andrew Sasinowski
(74) *Attorney, Agent, or Firm* — Rainier Patents, P.S.

(57) ABSTRACT

The description relates to smart rings. One example can include a finger band configured to accommodate a user's finger. This example can also include a set of pressure sensors positioned on an inner surface of the finger band and configured to sense changes to tendons of the user's finger as pressure differentials and to output associated signals. The example can further include a gesture component configured to interpret the signals from the set of pressure sensors to identify individual actions performed by the user's finger.

20 Claims, 8 Drawing Sheets

Scenario 500

Instance one

Instance two

Instance three

STROKE GESTURE PRIMITIVES 700

UP　　　　　　DOWN　　　　　　RIGHT　　　　　　LEFT

RIGHT UP　　　LEFT DOWN　　　LEFT UP　　　　RIGHT DOWN

)　　　　　(　　　　　(　　　　　(

RIGHT CIRCLE UP　RIGHT CIRCLE DOWN　LEFT CIRCLE UP　LEFT CIRCLE DOWN

WEARABLE DEVICE GESTURE DETECTION

BACKGROUND

Increasingly users interact with their mobile devices on the go. Many users continuously utilize various device applications. For instance, users listen to music on mobile devices while traveling, and constantly check E-mails. Shoppers browse through their shopping lists and do price comparisons while shopping, among others.

Interacting with mobile devices on-the-go tends to require the user to enter different gestures to scroll, zoom, flip, and/or enter text on graphical user interface (GUI) elements. The smart phone with its relatively large display has provided a unified and convenient platform for such interactions. However, more recent trends in wearable devices such as glasses, wrist bands, and watches have made such interactions limited and awkward due to the lack of touch real estate and the positioning of the device itself.

While mobile device interfaces continue to shrink, interfaces of remote display devices such as TVs and game consoles are becoming even more complex, requiring extensive maneuvering via simple remote controllers or requiring remote control with full keyboard-like capability. For example, with a conventional remote control, a simple task such as entering text to search for a movie title becomes a monumental task leading to a poor user experience.

SUMMARY

The description relates to smart rings. One example can include a finger band configured to accommodate a user's finger. This example can also include a set of pressure sensors positioned on an inner surface of the finger band and configured to sense changes to tendons of the user's finger as pressure differentials and to output associated signals. The example can further include a gesture component configured to interpret the signals from the set of pressure sensors to identify individual actions performed by the user's finger.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

OVERVIEW

The present concepts relate to allowing a user to use his/her fingers to control a device. The implementations relate to a wearable ring platform (e.g., smart ring) worn on one or more of the user's fingers. (As used herein, the term 'finger' can include the 'thumb'). The smart ring can detect and interpret various control gestures or actions performed by the user. The smart ring can wirelessly transmit the control gestures to the device. As used herein any action that can be performed by one or more fingers can be thought of as a gesture. Thus, the action of touching a surface with the finger can be an example of a gesture. Similarly, touching and sliding the finger on a surface can be a gesture. Moving the finger in the air or bending the finger can be a gesture. Further, the action of waving with one or more fingers can be a gesture. Actions performed by both hands can also be a gesture. In summary, actions can include touch gestures and non-touch gestures and/or single finger gestures and multi-finger gestures. Further examples of actions (e.g., gestures) are described below.

Figure 1:
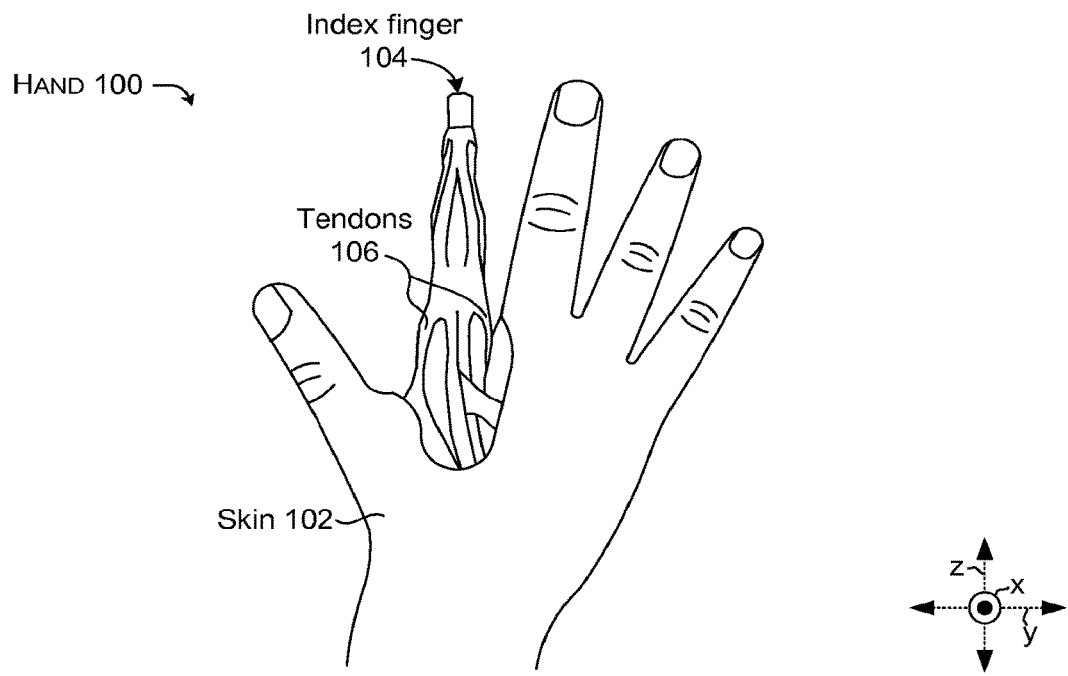
FIGS. 1 and 2 collectively show example smart ring applications in accordance with some implementations of the present concepts.
Figure 2:
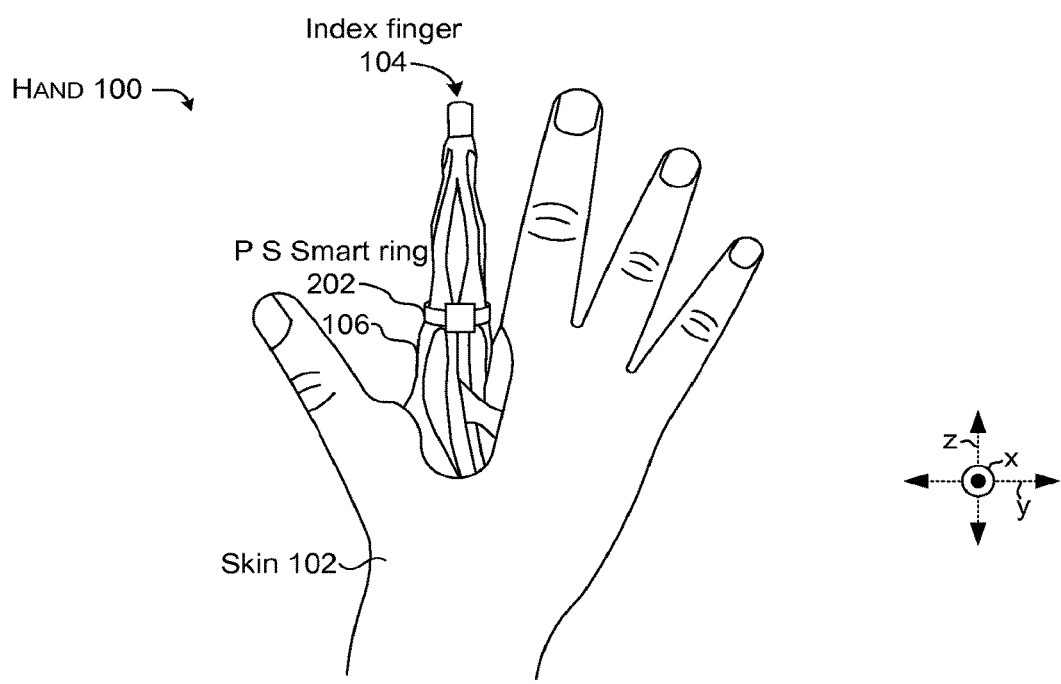

Introductory FIGS. 1-2 show a human hand 100. Most of the hand is covered with skin 102. However, for purposes of explanation, the skin is not shown for a portion of the hand relating to the index finger 104 to allow visualization of the underlying tissues. More specifically, tendons 106 are visible on the index finger. These tendons can move when the finger moves or when the finger imparts a force on a surface. FIG. 2 introduces a pressure sensitive smart ring (or 'smart ring device' or 'smart ring') 202 positioned on the user's index finger. The pressure sensitive smart ring can include elements for detecting changes to the tendons. Examples of these elements are discussed in more detail below relative to FIG. 6. (Note that to avoid clutter on the drawing page, on FIG. 2, the tendon 106 lead line only goes to one of the tendons rather than two in FIG. 1).

Figure 3:
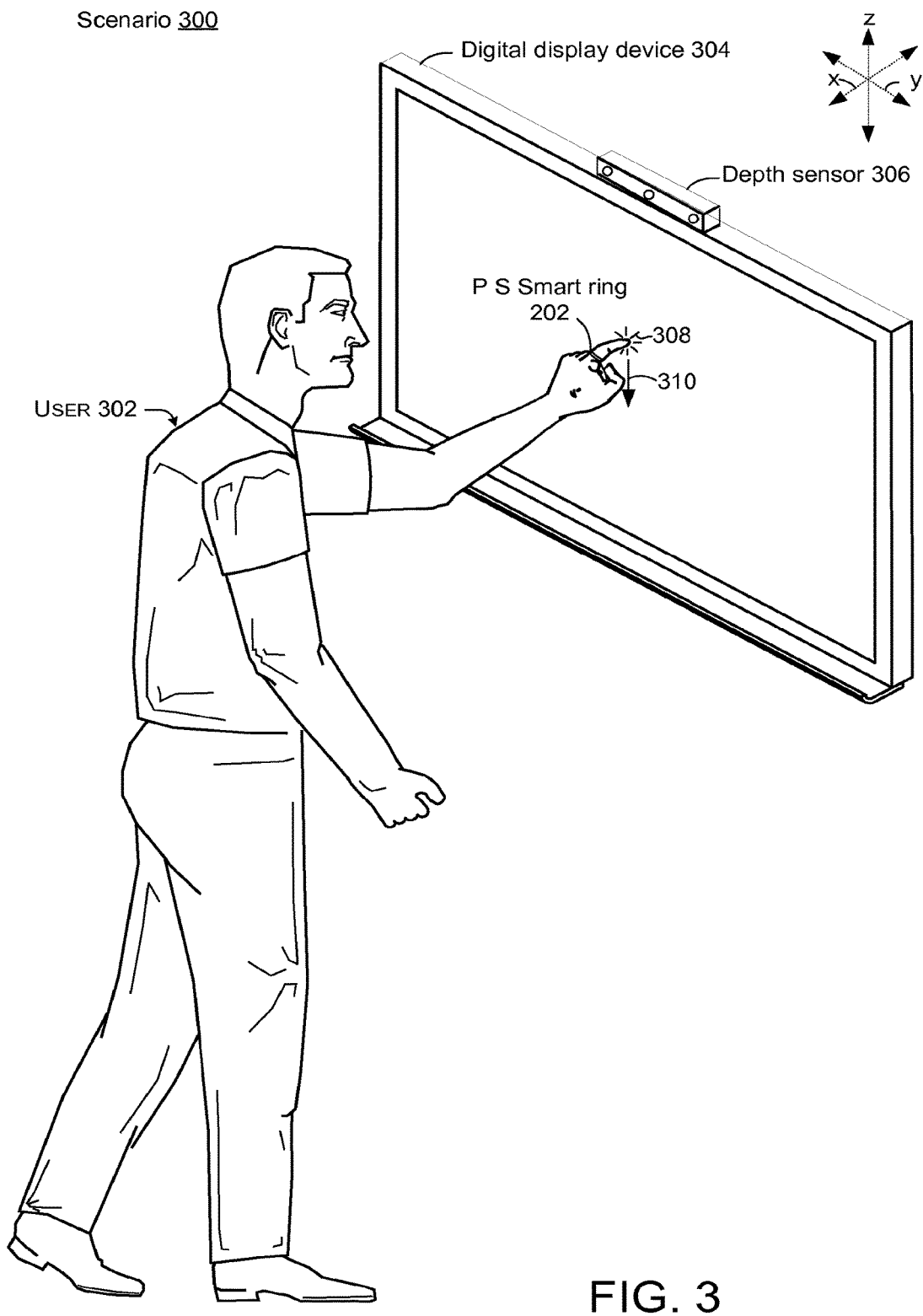
FIGS. 3-5 show example smart ring use case scenarios in accordance with some implementations of the present concepts.

FIG. 3 shows a first use case scenario 300 involving a user 302 wearing an example of pressure sensitive smart ring 202. In this case the user is engaging a digital display device 304. In this example, the digital display device includes a depth sensor 306. In some implementations the depth sensor can be manifest as a red, green, blue, plus depth (RGBD) camera. Various types of visible light, non-visible light, and/or sonic depth sensors, among others can be employed.

The depth sensor 306 can be useful in detecting the presence of user 302 in front of the digital display device 304 and detecting gestures performed by the user in front of the digital display device. However, the depth sensor may not be able to accurately detect user actions close to the digital display device. For instance, the depth sensor may not be able to distinguish whether the user is pointing at a location on the digital display device or touching the location on the digital display device. The pressure sensitive smart ring 202 can determine whether the user's finger is touching a surface as indicated by 'starburst' 308. Further, the pressure sensitive smart ring 202 can determine that while touching the surface the finger is moving in a downward direction as indicated by arrow 310. Data from the depth sensor 306 and the pressure sensitive smart ring 202 can detect user gestures in front of the digital display device as well as user contact of the digital display device. Thus, the pressure sensitive smart ring 202 and the depth sensor 306 can collectively provide information that can allow the digital display device to function in a manner similar to a touch sensitive display device without actually being 'touch sensitive.'

Figure 4:
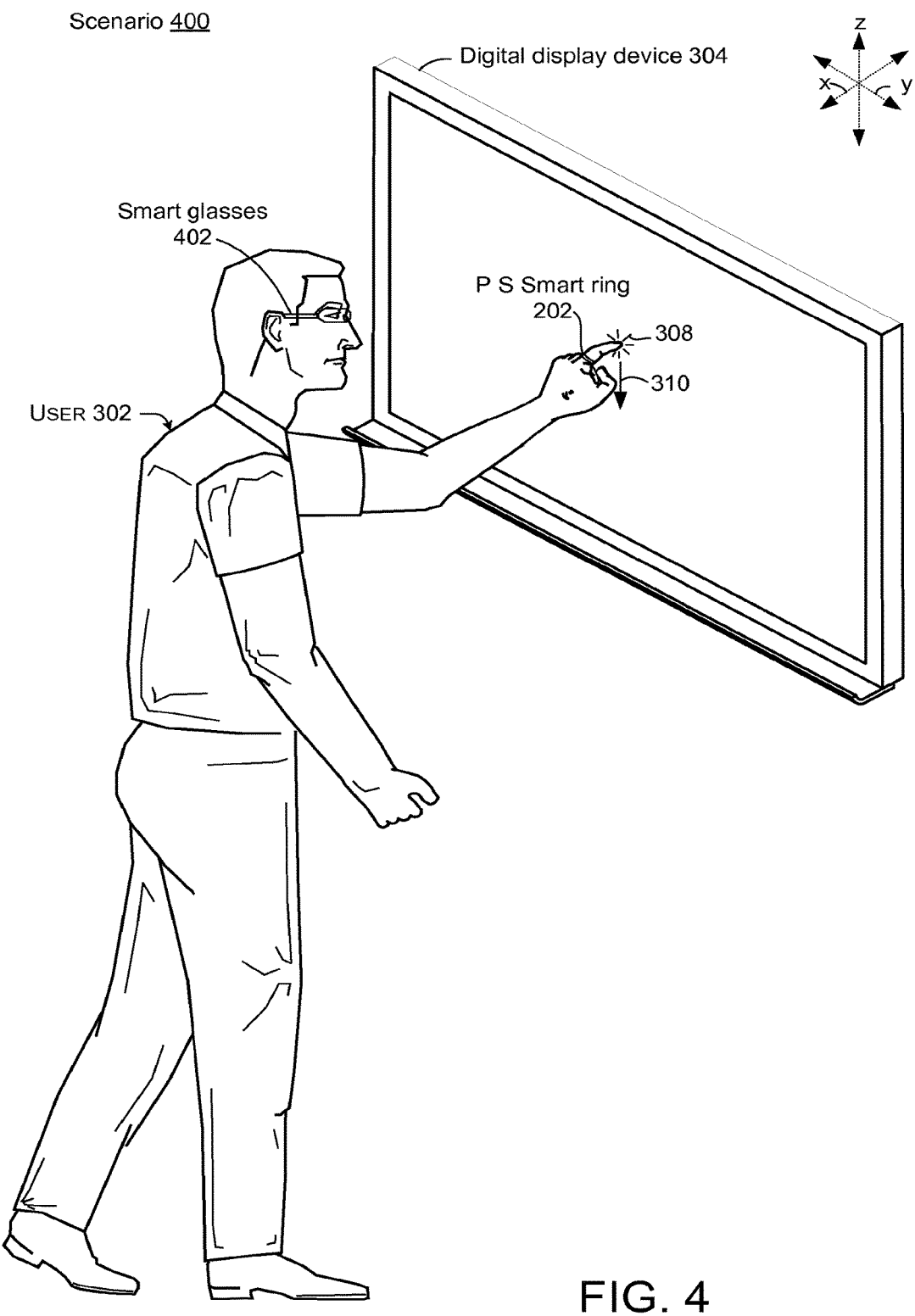

FIG. 4 shows another use case scenario 400 that is similar to the use case scenario of FIG. 3. In this case, the pressure sensitive smart ring 202 can operate cooperatively with smart glasses 402 to provide information about user 302. For instance, the smart glasses can capture information about what is in front of the user. In this example, the smart glasses can 'see' content on the digital display device 304. The smart glasses may be less effective at determining whether the user 302 is touching the digital display device 304. However, as explained above relative to FIG. 3, the pressure sensitive smart ring 202 can accurately determine whether the user is touching the digital display device. The pressure sensitive smart ring 202 and the smart glasses 402 can communicate with the digital display device 304 to detect user gestures (both touch and non-touch) to provide an enhanced interactive experience to the user.

Figure 5:
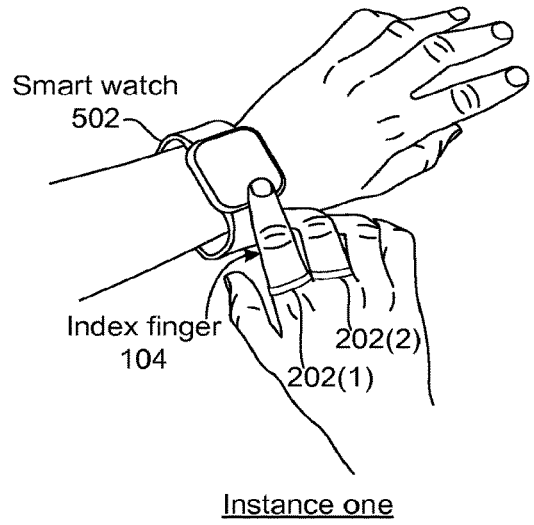
Figure 5:
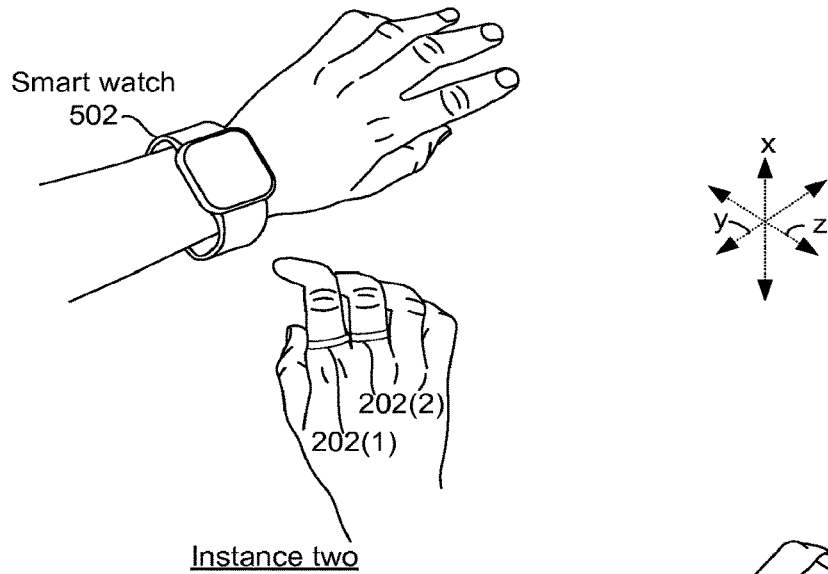
Figure 5:
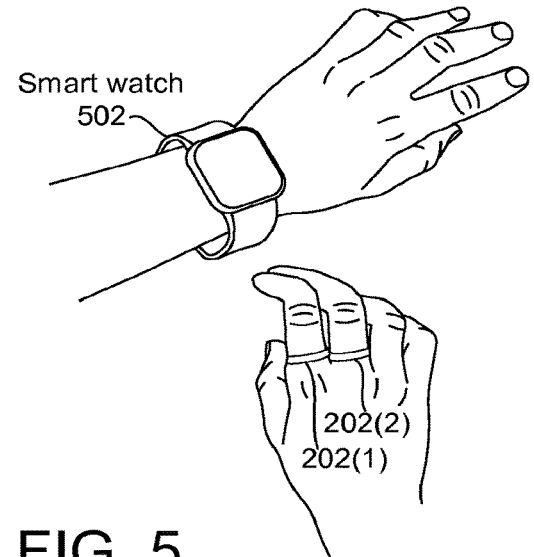

FIG. 5 shows another use case scenario 500 at instance one, instance two, and instance three. Scenario 500 involves pressure sensitive smart rings 202(1) and 202(2) and a smart watch 502. Pressure sensitive smart ring 202(1) is positioned on the user's index finger 104 and pressure sensitive smart ring 202(2) is positioned on the user's middle finger. Instance one shows the user touching the smart watch with his index finger 104. This touch can be detected by pressure sensitive smart ring 202(1). This touch can be interpreted as a first user command, such as to select an application to run on the smart watch.

Instance two shows the user performing a non-touch command by bending the index finger 104 at the middle joint. This non-touch command can be detected by pressure sensitive smart ring 202(1) and distinguished by the smart ring from the command of instance one by a pressure profile (e.g., which pressure sensors detect pressure). This command could be interpreted as a scroll down command by the smart watch, for example.

Instance three shows a similar non-touch command to instance two except that it is performed by both the index finger and the middle finger (e.g. a multi-finger gesture) and detected by pressure sensitive smart ring 202(1) and pressure sensitive smart ring 202(2). This command could be interpreted as a 'select' command by the smart watch, for example. Mechanisms for accomplishing this functionality are described below relative to FIG. 6.

Figure 6:
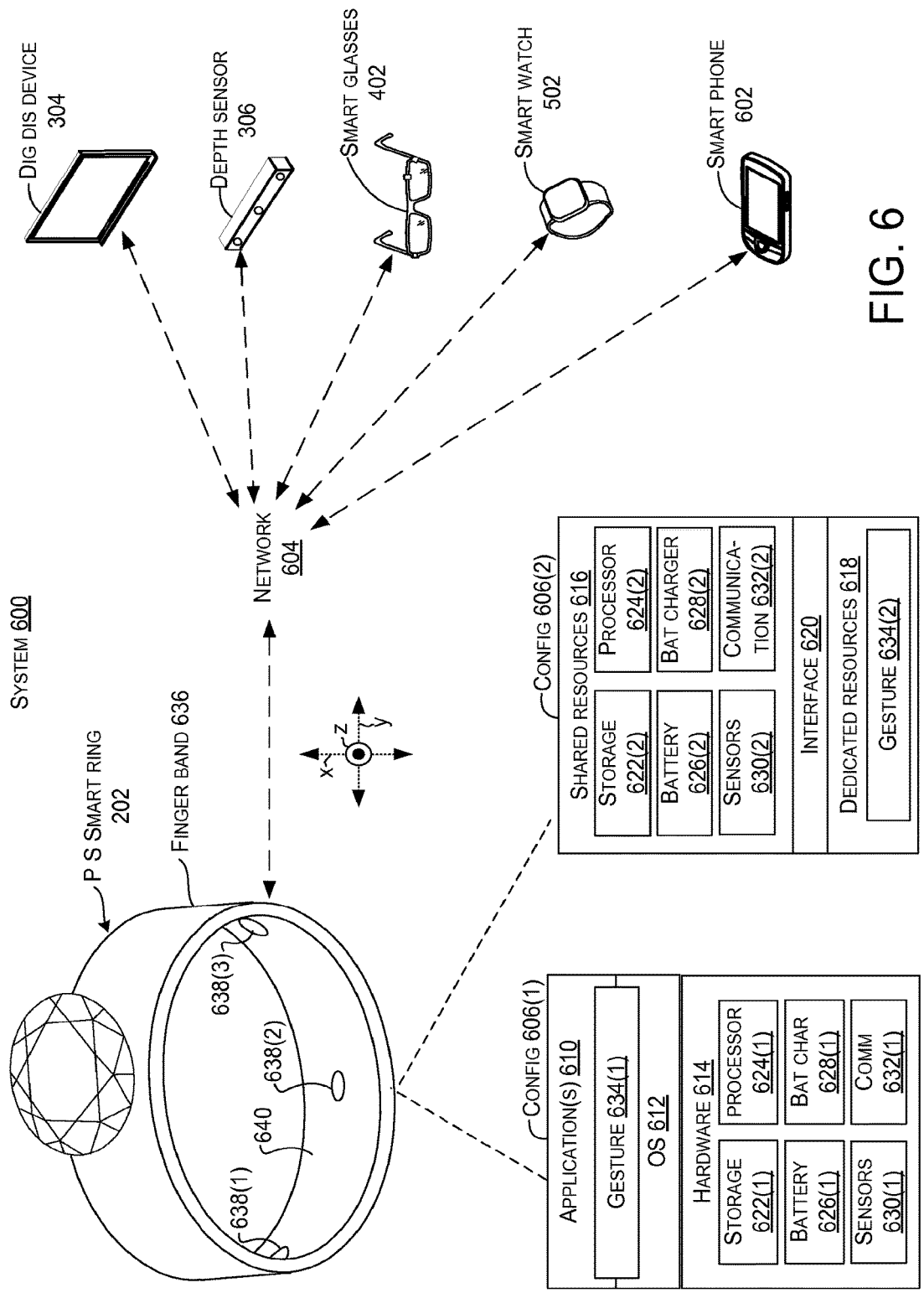
FIG. 6 shows a system example in accordance with some implementations of the present concepts.

FIG. 6 shows a gesture detection system 600. For purposes of explanation, system 600 includes pressure sensitive smart ring 202, digital display device 304, depth sensor 306, smart glasses 402, smart watch 502, and a smart phone 602. Any of these devices can communicate over one or more networks 604.

Two configurations 606(1) and 606(2) are illustrated for pressure sensitive smart ring 202. Briefly, configuration 606(1) represents an operating system centric configuration and configuration 606(2) represents a system on a chip configuration. Configuration 606(1) is organized into one or more applications 610, operating system 612, and hardware 614. Configuration 606(2) is organized into shared resources 616, dedicated resources 618, and an interface 620 there between.

In either configuration, the pressure sensitive smart ring 202 can include storage 622, a processor 624, a battery 626 (or other power source), a battery charger 628, sensors 630, a communication component 632, and/or a gesture component 634. These elements can be positioned in/on or otherwise associated with a physical finger band 636. For instance, the elements can be positioned within the finger band 636 so that the pressure sensitive smart ring 202 has the general appearance of a traditional 'jewelry' ring. The finger band 636 can be formed of various materials such as plastics, polymers, and/or natural materials such as jade or other minerals. The pressure sensitive smart ring 202 can also include ornamental aspects such as precious stones to mimic a traditional jewelry ring.

From one perspective, any of pressure sensitive smart ring 202, digital display device 304, depth sensor 306, smart glasses 402, smart watch 502, and/or smart phone 602 can be thought of as computers.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

As mentioned above, configuration 606(2) can be thought of as a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices.

Generally, any of the functions described herein can be implemented using software, firmware, hardware (e.g., fixed-logic circuitry), manual processing, or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

The battery 626 can be charged in various ways by the battery charger 628. In one instance, the battery charger is manifest as a wireless inductive charger. The wireless inductive charger can include multiple conductive coils wrapping around the pressure sensitive smart ring 202, such as following the ring shape of the finger band 636. In other configurations the coils can be associated with the ring but not coiled around the ring. For instance, small coils can be contained within the finger band or otherwise associated with the finger band. The wireless inductive charger can capture magnetic energy from wireless chargers. The wireless chargers can be included in any of digital display device 304, depth sensor 306, smart glasses 402, smart watch 502, smart phone 602, and/or other devices. Beyond the charging facet, the wireless inductive charging feature can provide a proximity sensing function for the two devices. For instance, when the user places his hand with the pressure sensitive smart ring 202 near the smart phone 602, the wireless inductive charger can detect the magnetic field of the smart phone and thus indicate to the pressure sensitive smart ring 202 that it is proximate to the smart phone. Similarly, the entry of the pressure sensitive smart ring 202 into the magnetic field generated by the smart phone can indicate to the smart phone that the pressure sensitive smart ring 202 is proximate to the smart phone. In summary, some pressure sensitive smart ring implementations can opportunistically harvest energy from an NFC-enabled companion device, such as devices 304, 306, 402, 502, and/or 602, among others for perpetual operation without explicit charging.

Further, powering sensors and analyzing sensor data consumes power. The gesture component 634 can manage the sensors 630, battery 626, processor 624, and/or other components to conserve resources. In other configurations a power management controller (not shown) may manage the components. Several techniques for conserving power usage are described below.

Multiple types of sensors 630 can be included in the pressure sensitive smart ring 202. Of course, the sensors can include pressure sensors 638. In this example, three pressure sensors are illustrated positioned on an inner surface 640 (e.g., inwardly facing surface) of the finger band 636. In this case, when the pressure sensitive smart ring 202 is worn by the user, pressure sensor 638(1) is configured to be positioned at the 8-9 o'clock position (with the diamond at the top of the ring acting as 12 o'clock). Pressure sensor 638(2) is configured to be positioned at the 6 o'clock position and pressure sensor 638(3) is configured to be positioned at the 3-4 o'clock position. Of course, other numbers and/or positions of pressure sensors can be employed. For example, a radial array of pressure sensors could be positioned on the inside surface of the ring so that even if the ring spins on the user's finger, pressure detected by generally opposing pressure sensors can be indicative of a touch gesture. Examples of pressure sensors can include force sensitive resistors and/or piezoelectric sensors, among others. In some cases the pressure sensor can be coupled to a low power comparator and controlled by power gating as determined by the gesture component 634.

Sensors 630 can also include accelerometers, gyroscopes, magnetometers, and/or microphones, among others. For instance, the implementation of FIG. 4 can include pressure sensors to detect contact with the surface and accelerometers to detect the downward movement. While not shown in FIG. 4, the gyros could further detect 'twisting' of the pressure sensitive smart ring 202 to allow a straight down movement to be distinguished from a down and to the left or a down and to the right gesture. In another configuration, motion can be detected via the microphone as audio signals. Such a configuration can use less power than may be consumed by accelerometers.

In one such implementation an audio based motion detector can have multiple sub modules, such as a microphone with a built-in amplifier and high pass filter, a high-pass analog filter to filter out typical environmental noise, an amplifier, a low-pass filter, and an envelope detector.

The gesture component 634 can receive input from the sensors 630. The gesture component 634 can identify user actions from the sensor input. For instance, assume that the user performs the touch action of instance one of FIG. 5. In that case, pressure sensors 638(1) and 638(3) of FIG. 6 would detect pressure created by the lateral tendons and pressure sensor 638(2) would not detect pressure. The gesture component can interpret the output of the three sensors 638(1)-638(3) as a touch gesture. Now assume that the user performs the finger bend gesture of FIG. 5 instance two. In that case, each of sensors, 638(1), 638(2), and 638(3) would detect pressure. The gesture component can interpret the output of the three sensors 638(1)-638(3) as a non-touch finger bend gesture.

Other action detection (e.g., gesture detection) scenarios that involve identification of tapping, swiping, scrolling, and stroking for hand written text entry are described below.

The communication component 632 can allow the pressure sensitive smart ring 202 to communicate with various devices, such as the illustrated companion devices. The communication component can include a receiver and a transmitter and/or other radio frequency circuitry for communicating with various technologies, such as cellular, Wi-Fi (IEEE 802.xx), Bluetooth, etc.

Note that in some cases the gesture component 634 on the pressure sensitive ring 202 can be relatively robust and perform analysis on signals received from sensors 630 to identify a user action. The gesture component could then send an indication of the identified user action to a companion device (e.g., any of devices 304, 306, 402, 502, and/or 602) that the pressure sensitive smart ring is operating in cooperation with. In other cases, the pressure sensitive smart ring could send the signals to the companion device. A gesture component (not shown) on the companion device could then analyze the sensor signals to identify the user action. In a similar scenario the pressure sensitive smart ring could send information to a remote resource, such as cloud based resources for processing.

The discussion below provides further details on specific implementations of the pressure sensitive smart ring 202. For purposes of explanation, in this discussion smart phone 602 operates as a companion device to the pressure sensitive smart ring 202. In this case, sensors 630 include force sensitive resistors, accelerometers, and an audio based sensor configured to detect motion of the user's finger on a surface. In this discussion, only a single pressure sensitive smart ring 202 is employed, but as noted above, the user could wear anywhere from one to ten pressure sensitive smart rings 202 (e.g., one on each finger including thumbs).

To conserve energy, the gesture detection component 634 can place the pressure sensitive smart ring 202 in an inactive sleep state to prevent accidental interpretation of day-to-day user activities as gestures. In this state, the ring's accelerometer can be in a low-power autonomous motion-detection state.

When the user is ready to enter gestures on an available surface, the pressure sensitive smart ring 202 can be brought into an active state by tapping the surface four times (or some other unique action). Once in the active state, the pressure sensitive smart ring 202 can enter a touch-detect active state by turning on the touch detection sensor. The 1st tap can help trigger the accelerometer motion detector, while the rest of the taps can be used to reduce accidental triggering of the active state. The gesture component 634 can collect raw accelerometer readings which can also be buffered during the touch-detect state.

When the user touches the surface to enter a gesture, the touch is detected by the pressure sensors, and the pressure sensitive smart ring 202 can enter motion-detect state. In the motion-detect state, the audio-based motion detector can be turned on to detect the motion of the finger along the surface. During this state, processed accelerometer components along a plane of the ring can be stored (e.g., yz plane). At the end of motion or the touch, the gesture detection component 634 can employ a classifier to the accelerometer data to identify the gesture.

This implementation of the gesture component 634 can implement the following four groups of gestures including, tap, swipe, scroll, and written text, which are summarized in Table 1. Of course other gestures are contemplated, especially when the user wears pressure sensitive smart rings on multiple fingers.

Tap. The tap gesture can satisfy a similar functionality to the typical tap gesture on a touch sensitive surface, or the left mouse click. Similar to touch surfaces and mice, multiple, closely spaced, tap actions can define multiple gestures. For instance, two double-taps can be used to transition between "active" and "inactive" modes as described above.

Swipe. The swipe gesture can be used with primitive touch interfaces for quickly scanning through multiple windows or a collection of items such as photos. This implementation of the pressure sensitive smart ring 202 can support four different swipe actions which include: swipe-up, swipe-down, swipe-left, and swipe-right.

TABLE 1

Different gestures, including different modes, and number of classification primitives can be implemented on the pressure sensitive smart ring 202.

| Gesture | Modes | # primitives |
|---|---|---|
| Tap | down | 1 |
| Swipe | up, down, left, right | 4 |
| Scroll | up, down, left, right right-up, left-down | 6 |
| Written Text | English characters | 12 |

Scroll. The scroll action can be similar to the touch surface or mouse-based scroll. The gesture component 634 can identify six scroll actions: scroll-left, scroll-right, scroll-up, scroll-down, scroll-right-up, and scroll-left-down.

Writing-based text entry. The pressure sensitive smart ring 202 can also implement a writing-based English text entry, where the user can simply write the characters on a surface using the index finger.

Figure 7:
FIG. 7 shows stroke gesture primitives that can be utilized in accordance with some implementations of the present concepts.
Figure 7:
Figure 7:
Figure 7:
Figure 7:
Figure 7:
Figure 7:
Figure 7:
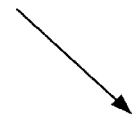

The gesture component 634 can treat each character as a combination of multiple primitive shapes called "strokes". FIG. 7 shows examples of stroke gesture primitives 700. In this example, 12 strokes are used for text entry in this implementation. The strokes can include directional and/or rotational movements. The gesture component can identify these strokes, and can also measure inter-stoke latencies which can help identify strokes belonging to a single character. The stroke identifiers and inter-stroke latencies can be used to identify the individual characters at a remote device.

Energy Harvesting

In this implementation, size and weight constraints limit the size of the battery used to power the pressure sensitive smart ring 202. In one case, a 10 mAh battery capacity can be used to approximate a traditional jewelry type ring. This battery can fit in the crown or the finger band of the pressure sensitive smart ring 202.

This relatively small 10 mAh battery capacity may cause the user to recharge the battery several times within a day, which would potentially be a large obstacle to the usability of the platform. To overcome this limitation, the pressure sensitive smart ring 202 can use the subcarrier based NFC energy harvesting approach to passively recharge the ring battery while the user is holding the smart phone 602 next to the ring.

To harvest energy from an NFC enabled antenna, the smart ring has a coil loop wound around the ring finger band. Winding the coil around the ring finger band can enable a large (and potentially maximum) loop size to achieve better energy harvesting.

Surface Detection

This implementation can use a combination of two techniques to detect the motion of the user's finger on a surface. As mentioned above, the pressure sensor can detect the finger touching a surface by sensing the pressure imparted by a lateral tendon of the finger; while an energy-efficient audio sensor can detect the movement of the finger on the surface by listening to the audio signal generated by the friction between the finger and the surface.

More specifically, the gesture component 634 can interpret the acoustic signals generated due to the friction when the finger moves across the surface to detect finger motion on the surface.

The amount of audio energy emitted from the finger/surface interaction is a function of the speed of finger motion and the physical properties of the surface.

Some implementations can offer enhanced surface detection using pressure and audio-based techniques. For instance, a combination of tendon pressure and audio based techniques can be analyzed to provide efficient and reliable surface detection due to the complementary characteristics of these techniques.

The tendon pressure-based technique can consume an order of magnitude less power than the audio-based solution, however, unlike the audio based solution, the pressure-based technique tends not to be able to identify finger motion directly. Accelerometers offer another solution, but at the potential cost of extra processing overhead and segmentation errors that can severely affect the system performance.

The audio-solution can detect both motion and touch during motion. However, the audio-based solution can be affected by ambient audio noise-induced errors. Band-pass filtering can remove a significant portion of these errors. The touch detector can prevent the accidental triggering of motion sensing due to errors that are not filtered. The touch detector can also prevent cascading failures by touch-based gating of the gesture detection in the presence of noise.

Gesture Classification

In some implementations the gesture component 634 can utilize classifiers for identifying the gesture primitives. For instance, gesture primitives can be categorized based on starting dynamics, real-timeliness, and context dependency of interpretation.

Hard landing gestures start with the user's finger landing on the surface at a relatively high velocity. Both taps and swipes can be hard landing gestures. Soft landing gestures can start with the finger meeting the surface at a low velocity. Both scroll gestures and strokes for text entry can be soft landing gestures.

The scroll gestures can entail real-time identification, since the user tends to desire continuous feedback on the current scroll position. Due to short interaction time, both tap and swipe gestures can be identified in non-real-time after the gesture has been completed. The strokes for text entry can also be identified in non-real-time, at the end of each stroke to improve classification accuracy. This is acceptable since the high-level symbols, such as characters, can only be interpreted after collecting all strokes that make up the character, due to lack of absolute position.

Context free gestures are gestures that can be interpreted on the pressure sensitive smart ring 202 without the knowledge of the user interface (UI) element the user is interacting with. Both tapping and swiping gestures belong to this category.

Context dependent gestures can utilize knowledge of the current UI element type for correct interpretation by the pressure sensitive smart ring 202. Some of the stroke and scroll gestures that look identical can be interpreted differently due to different real-time needs. To enable proper interpretation of these, the gesture component 634 can operate on the presumption that the remote device informs the pressure sensitive smart ring 202 when the user starts and stops interacting with a text entry area.

Resolving Angular Ambiguity of Accelerometer Data

The pressure sensitive smart ring 202's gesture component 634 can use the accelerometer data to identify different gestures on a surface. When gestures are performed on a surface, the signature of the gesture tends to be captured in the acceleration components that are parallel to the surface of interaction. Since the pressure sensitive smart ring 202, when worn on the finger, does not stay parallel to the interaction surface, and since individual users' frames of reference will differ from one another, the gesture component can convert the (x,y,z) components of the accelerometer to the (x,y,z) components with respect to the interacting plane. Some implementations can assume a horizontal plane of interaction, which is true for most of the interaction surfaces available in the environment. Other implementations can handle the interaction on an arbitrarily inclined plane.

For computing the components along the interacting plane, the gesture component 634 can use the gravity acceleration vector just prior to movement of the finger to determine the inclination of the finger to the plane, since this angle can vary across users and instances.

To perform this normalization, the gesture component 634 can compute two angles: pitch ($\theta$) and roll ($\phi$). These angles can be computed according to the following equations:

$$\theta_{xyz} = \tan^{-1}\left(\frac{-G_{px}}{G_{pz}}\right) \quad (1)$$

$$\phi_{xyz} = \tan^{-1}\left(\frac{G_{py}}{\sqrt{G_{px}^2 + G_{pz}^2}}\right) \quad (2)$$

After computing these angles while the finger is stationary, they can be applied to subsequent accelerometer samples to compensate for finger orientation while the finger is moving:

$$x_{normal} = -x \cdot \cos(-\phi) + z \cdot \sin(-\phi) \quad (3)$$

$$y_{normal} = y \cdot \cos(\theta) - z \cdot \sin(\theta) \quad (4)$$

There are two limitations to correcting for the finger angle in this way. First, some implementations can operate on the assumption that these angles do not change during a gesture—if this assumption is violated, the gravity vector may pollute the x and y components, and a fraction of the x and y accelerations will be falsely attributed to the z axis.

Second, some implementations do not correct for a third orientation angle, yaw ($\psi$), if gyros are not utilized (gravity vector provides no information as to how the finger twists in a plane perpendicular to gravity). Thus, these implementations can leverage the assumption that the user's finger motion will be perpendicular to their body and the impact of $\psi$ is negligible. If this assumption is violated, the x and y acceleration components may not be properly separated. While worth noting, neither of these limitations tends to have a significant impact on classification accuracy.

Gesture Classification Overview

Some implementations of the gesture component 634 can use a two-level classification scheme for gesture classification. When the pressure sensors indicate a touch event, the top-level classifier, called the landing classifier, can be invoked to classify the event as either a soft landing event or a hard landing event. The gesture component 634 can evaluate the output of the landing classifier and the UI context reported by the companion device (e.g., the device the user is engaging). The gesture component 634 can then invoke one of the low level classifiers—swipe-tap, stroke, or scroll.

The gesture component 634 can also invoke the swipe-tap classifier to handle a hard landing. This classifier can use the surface touch duration—determined by the length of the audio envelope, and the accelerometer samples to classify the event as either a tap gesture or one of the four swipe gestures.

For a soft landing, if the context reports text input, the gesture component 634 can invoke the stroke classifier. Since there can be multiple consecutive strokes during a single touch, for example when writing L character, accelerometer data collected after the soft landing can be segmented based on the audio envelope. These segmented data can be fed to the stroke classifier to classify the stroke to one of the 12 possible strokes. This process can continue until the finger leaves the surface.

For a soft landing with a non-text input context, the gesture component 634 can invoke the scroll classifier. The scroll classifier can first detect a short 'nudge' at the start of the scroll based on the audio envelope, and can classify the data collected between the touch event and the end of the nudge to determine the type of scroll event. After this classification stage, the smart ring periodically can transmit 'in-scroll' messages to the companion device to provide real-time information on the continued scroll event until the finger stops moving and leaves the surface.

Figure 8:
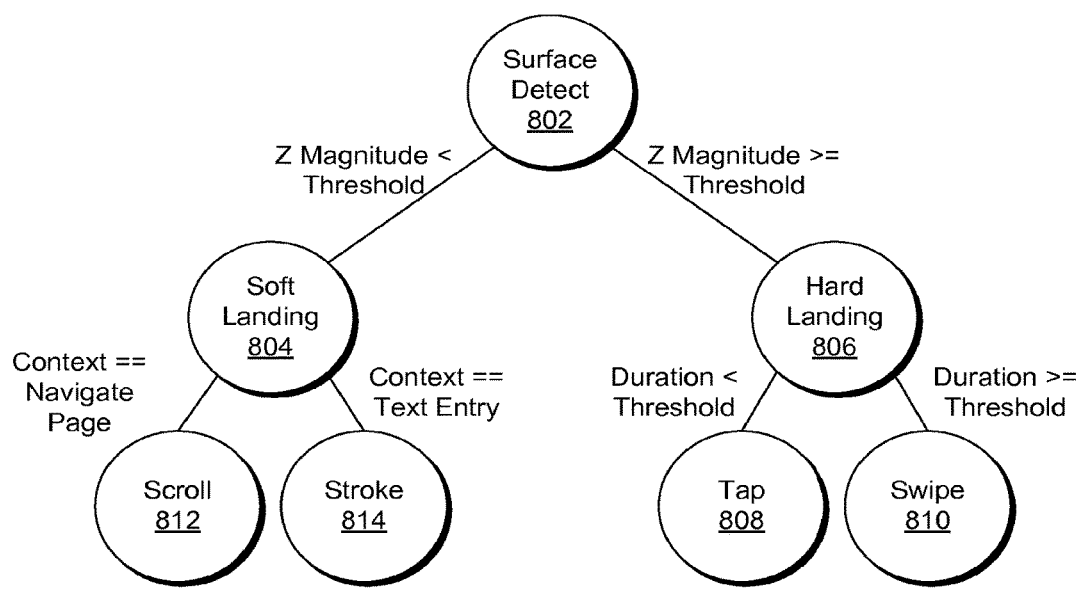
FIG. 8 shows a state diagram that can be utilized in accordance with some implementations of the present concepts.

FIG. 8 shows a state diagram 800 of how different classification stages can be invoked in some implementations. The rest of this section describes these classification stages in more detail.

Landing Classifier

While the finger is moving on a surface, negligible activity on an accelerometer's z-axis is expected. However, when the finger initially lands on the surface, the finger can abruptly stop, causing large magnitude, short-lived spikes induced by the finger's sudden deceleration. The gesture component 634 (FIG. 6) can classify hard landings versus soft landings by exploiting this activity on the accelerometer z-axis at the beginning of a gesture entry. When a surface is initially detected at 802, n samples can be evaluated surrounding the start of motion. These n samples may be used as the input to a heuristic, threshold-based classification or as the input to an SVM classifier. The intuition behind the efficacy of each of these approaches is the existence of large, observable deltas in z-axis acceleration. To summarize, the z-axis magnitude can be compared to a threshold. A magnitude below the threshold can indicate a soft landing 804. A magnitude that is equal to or above the threshold can indicate a hard landing 806.

Swipe-Tap Classifier

The swipe-tap classifier can be invoked after detecting a hard landing 806. A duration envelope of the contact of the finger across the surface can be compared to a duration threshold. A duration envelope that is less than the duration threshold can indicate a tap event 808. A duration that is longer than the duration threshold can indicate a swipe event 810.

A tap gesture can be identified solely from the envelope information, while identification of a swipe can entail further classification.

Stroke Classifier

Returning to soft landing 804, the soft landing can be evaluated to distinguish a scroll 812 from a stroke 814. An SVM classifier can be utilized to classify strokes. The SVM classifier can use the x, y, and z axis accelerometer readings as the feature vector. Since the stroke duration can vary at different instances as well as across users, a sample, such as 100 points can be linearly interpolated across each x and y axis sample for a given gesture. A fixed number of averages can be computed across these interpolated points for each axis. This set of averages can then be passed to the SVM classifier.

Scroll Classifier

Scroll classification can happen after a stroke is detected based on the context of the remote user interface (e.g., the companion device that the user is engaging). A short gesture, called a 'nudge', can be detected and classified using the SVM classifier to determine the start of one of the six possible scroll gestures. Some implementations can utilize a relatively small number of (such as six) different scroll gestures to ease classification of the scroll action with only a small number of samples. After the user performs the nudge, the length of the envelope can provide real-time information to the remote device on the progress of the scroll action.

Operating Modes

When the pressure sensitive smart ring 202 is in the active mode (touch-detect, or touch-process), the activity of the platform can be driven by the accelerometer. The accelerometer can autonomously collect samples at ≃400 Hz (for example) and can interrupt the microcontroller when a new sample is available.

During touch-detect, the sampled data can be buffered for landing type estimation, the microcontroller interrupt service routine (ISR) also can check the status of the touch detector.

If touch is active, the pressure sensitive smart ring 202 can transition to touch-process mode. In this mode, the audio-based motion detector output can be sampled at ≃100 Hz with processor ADC (at every 4th ISR). Once motion is detected—determined by the change of audio envelope by a preset threshold—the pressure sensitive smart ring 202 can start accumulating coordinate-aligned accelerometer data. At the end of the motion, the appropriate classifier can be invoked, and the results can be transmitted over the radio (e.g., communication component 632), such as by using a best effort transmission scheme.

SVM Classifier Implementation

As introduced above, an SVM classifier can be employed for gesture classification. The SVM classifier can be a multi-class linear-kernel SVM classifier. The SVM classifier can use pair-wise classification, entailing n(n−1)/pair-wise classifiers to classify n classes.

Some implementations can use four features for each x and y axis, resulting in eight SVM features. Each $(F(i)_x, F(i)_y)$ feature tuple can be calculated by first breaking all the (x,y) acceleration data in to four buckets, and then averaging the data in each bucket. The x and y acceleration component of each data sample can be computed immediately after reading (x,y,z) acceleration data sample from the accelerometer.

Due to limited RAM size, instead of buffering data at 400 Hz until the end of a gesture, some implementations can employ running averages of each n samples of data to be calculated. Value n can be selected such that there are at most 60 computed averages for the worst case duration of each gesture class. Once the gesture ends, these pre-computed averages can be broken into four equal-size buckets to compute the four feature tuples.

NFC Energy Harvesting

As mentioned above, wireless charging can be achieved via magnetic fields generated by a companion device, such as smart phone 602. Some implementations can be configured so that the charging occurs efficiently (potentially maximally) when the user holds the smart phone in a natural manner with the ring bearing hand.

In summary, at least some of the present implementations can offer a low-power wearable smart ring that can enable users to enter gestures by interacting on arbitrary surfaces. The smart ring can use energy efficient finger-tendon based touch detection and audio-based motion detection to capture user interaction instances. A light-weight mufti-classifier solution accurately classifies different gesture primitives. In one case, using a 10 mAh battery powered by energy harvested from an NFC-enabled smart phone, the ring can support more than 10 hours of active user interactions.

EXAMPLE METHODS

Figure 9:
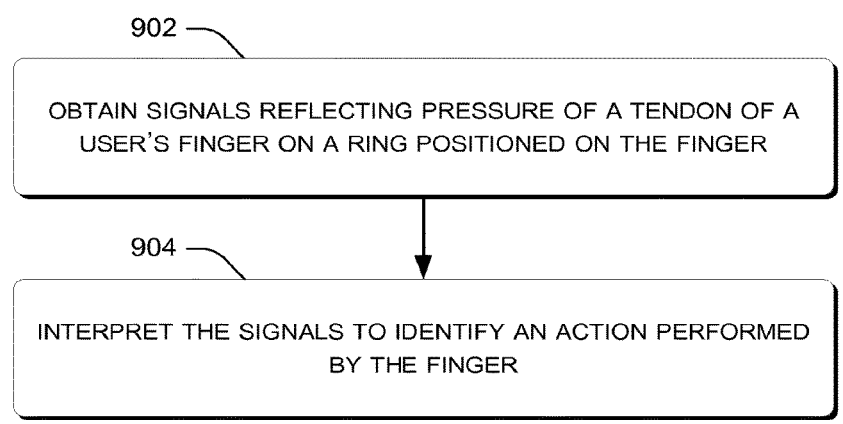
FIG. 9 shows an example flow chart in accordance with some implementations of the present concepts.

FIG. 9 illustrates a flowchart of a method or technique 900 that is consistent with at least some implementations of the present concepts.

At block 902, the method can obtain signals reflecting pressure of a tendon of a user's finger on a ring positioned on the finger.

At block 904, the method can interpret the signals to identify an action performed by the finger.

In some cases, the method can be performed on the ring by a processor or microcontroller. In other cases, the signals can be sent from the ring to another device, such as a companion device that is proximate to the ring and is working cooperatively with the ring. The companion device can then perform the interpreting. Some implementations can involve a single user wearing multiple rings. In such a case, each ring can communicate its signals to the companion device (e.g., with a different ring identifier with the signals). The companion device can then interpret actions relating to a single finger or multiple fingers (e.g., multi-finger gestures). For instance, the user may have waved a single finger to invoke a specific user command or the user could have waved all the fingers of the hand to invoke a different user command. In some cases, the smart ring may contain other sensors that sense other parameters. Signals from the other sensors can be interpreted in combination with signals from the pressure sensors to identify the user action. In still other cases, sensors on other devices may provide signals that can be utilized in combination with the sensed signals to identify the user action. Examples of such scenarios are illustrated relative to FIGS. 3-5 where the digital display 304, the depth sensor 306, the smart glasses 402, and/or the smart watch 502 may sense the user and provide data that is useful in combination with the pressure data. Also, in some cases, such as a digital whiteboard scenario, multiple users may be performing actions and each user may be wearing one or more smart rings.

The order in which the above methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method (e.g., computer-implemented method). In one case, the method is stored on a computer-readable storage media as a set of instructions such that execution by a processor of a computing device causes the computing device to perform the method.

CONCLUSION

In summary, the present implementations can derive useful information about user actions from pressure sensors on a smart ring worn on a user's finger.

The described methods or processes can be performed by the systems and/or devices described above, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

Although techniques, methods, devices, systems, etc., pertaining to detecting user actions are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A wearable device comprising:
at least one sensor configured to output a sensor signal reflecting movement of the wearable device; and
at least one processor or hardware logic circuit configured to:
receive a report from a remote device with which the wearable device is capable of interacting;
determine, based at least on the report received from the remote device, a current user interface context of the remote device; and
selectively interpret the sensor signal based at least on the current user interface context of the remote device to identify a particular gesture being performed with the wearable device.

2. The wearable device of claim 1, wherein the at least one processor or hardware logic circuit is further configured to:
determine that the report indicates that the current user interface context of the remote device is a text entry context; and
based at least on determining that the report indicates that the current user interface context of the remote device is the text entry context, identify the particular gesture as a writing stroke.

3. The wearable device of claim 1, wherein the at least one processor or hardware logic circuit is further configured to:
determine that the report indicates that the current user interface context of the remote device is not a text entry context; and
based at least on determining that the report indicates that the current user interface context of the remote device is not a text entry context, identify the particular gesture as a scroll event.

4. The wearable device of claim 1, the at least one sensor being an accelerometer.

5. The wearable device of claim 4, wherein the at least one processor or hardware logic circuit is further configured to:
when an accelerometer signal received from the accelerometer is indicative of a landing on another surface, compare a magnitude of the accelerometer signal to a threshold;
in instances when the magnitude of the accelerometer signal exceeds the threshold, identify the particular gesture as a hard-landing gesture; and
in other instances when the magnitude of the accelerometer signal does not exceed the threshold, identify the particular gesture as a soft-landing gesture.

6. The wearable device of claim 5, wherein the at least one processor or hardware logic circuit is further configured to:
compare a duration of the hard-landing gesture to a duration threshold;
when the duration of the hard-landing gesture is less than the duration threshold, interpret the hard-landing gesture as a tap gesture; and
when the duration of the hard-landing gesture is greater than the duration threshold, interpret the hard-landing gesture as a swipe gesture.

7. The wearable device of claim 1, the remote device being a local companion device, wherein the at least one processor or hardware logic circuit is further configured to:
transmit an indication of the particular gesture to the local companion device.

8. The wearable device of claim 7, wherein the at least one processor or hardware logic circuit is further configured to:
transmit the indication of the particular gesture to the local companion device using short-range wireless communication.

9. A method comprising:
obtaining a sensor signal reflecting movement of a wearable device;
receiving a report from a remote device with which the wearable device is capable of interacting;
determining, based at least on the report received from the remote device, a current user interface context of the remote device; and
selectively interpreting the sensor signal based at least on the current user interface context of the remote device to identify a particular gesture being performed with the wearable device.

10. The method of claim 9, further comprising:
transmitting an indication of the particular gesture to the remote device.

11. The method of claim 9, performed entirely by the wearable device.

12. The method of claim 9, further comprising:
when the current user interface context is a text entry context, interpreting the particular gesture as a writing stroke.

13. The method of claim 12, further comprising:
identifying a particular character entered at least in part by the writing stroke; and
entering the particular character to the remote device.

14. The method of claim 13, further comprising:
when the current user interface context is not a text entry context, interpreting the particular gesture as a scroll event.

15. The method of claim 14, further comprising:
identifying a particular direction of the scroll event; and
causing the remote device to perform a scrolling action in the particular direction.

16. A computer-readable storage medium storing instructions which, when executed by a processor, cause a processor to perform acts comprising:
obtaining a sensor signal reflecting movement of a wearable device;
receiving a report from a remote device with which the wearable device is capable of interacting;
determining, based at least on the report received from the remote device, a current user interface context of the remote device; and
selectively interpreting the sensor signal based at least on the current user interface context of the remote device to identify a particular gesture being performed with the wearable device.

17. The computer-readable storage medium of claim 16, the acts further comprising:
transmitting an indication of the particular gesture to the remote device using short-range wireless communication.

18. The computer-readable storage medium of claim 16, the acts further comprising:
processing the sensor signal using a trained classifier to identify the particular gesture.

19. The computer-readable storage medium of claim 18, the sensor signal comprising an accelerometer signal, the trained classifier comprising a support vector machine configured to classify the accelerometer signal as writing strokes or scroll gestures.

20. The computer-readable storage medium of claim 16, the acts further comprising:
interpreting the particular gesture as a writing stroke when the report indicates that the current user interface context of the remote device is a text entry context; and
interpreting the particular gesture as a scroll event when the report indicates that the current user interface context of the remote device is not a text entry context.

* * * * *